US009268967B2

(12) United States Patent
Youd et al.

(10) Patent No.: US 9,268,967 B2
(45) Date of Patent: Feb. 23, 2016

(54) INTERNET PROTOCOL NETWORK MAPPER

(71) Applicant: Lawrence Livermore National Security, LLC, Livermore, CA (US)

(72) Inventors: David W. Youd, Livermore, CA (US); Domingo R. Colon, III, Dublin, CA (US); Edward T. Seidl, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 427 days.

(21) Appl. No.: 13/801,931

(22) Filed: Mar. 13, 2013

(65) Prior Publication Data
US 2014/0270157 A1    Sep. 18, 2014

(51) Int. Cl.
G06F 15/16    (2006.01)
G06F 21/64    (2013.01)
G06F 17/30    (2006.01)
H04L 12/24    (2006.01)

(52) U.S. Cl.
CPC .......... *G06F 21/64* (2013.01); *G06F 17/30312* (2013.01); *G06F 17/30339* (2013.01); *H04L 41/0853* (2013.01)

(58) Field of Classification Search
None
See application file for complete search history.

(56) References Cited

U.S. PATENT DOCUMENTS

| | | | | |
|---|---|---|---|---|
| 2008/0136448 A1* | 6/2008 | Ng | | G05B 19/045 326/46 |
| 2009/0290513 A1* | 11/2009 | Swan | | H04L 41/0213 370/255 |
| 2010/0153525 A1* | 6/2010 | Parekh | | G06F 17/30241 709/221 |
| 2012/0246216 A1* | 9/2012 | Hinni | | H04L 67/16 709/202 |
| 2013/0066923 A1* | 3/2013 | Sivasubramanian | | G06F 17/30306 707/802 |
| 2013/0170397 A1* | 7/2013 | Tamura | | H04L 41/0233 370/254 |
| 2013/0205292 A1* | 8/2013 | Levijarvi | | G06F 11/1415 717/177 |

OTHER PUBLICATIONS

Smith, Ian, "Guide to Using SQL: Sequence Number Generator," Oracle RdB Journal—Sequence Number Generator, pp. 1-17, May 2003.
"Cryptographic Hash Function," 5 pages (last accessed Feb. 28, 2013 from http://en.wikipedia.org/wiki/Cryptographic_hash_function).
"Classless Inter-Domain Routing," 6 pages (last accessed Feb. 27, 2013 from http://en.wikipedia.org/wiki/Classless_Inter-Domain_Routing).

* cited by examiner

*Primary Examiner* — Joshua Joo
(74) *Attorney, Agent, or Firm* — Perkins Coie LLP

(57) ABSTRACT

A network mapper for performing tasks on targets is provided. The mapper generates a map of a network that specifies the overall configuration of the network. The mapper inputs a procedure that defines how the network is to be mapped. The procedure specifies what, when, and in what order the tasks are to be performed. Each task specifies processing that is to be performed for a target to produce results. The procedure may also specify input parameters for a task. The mapper inputs initial targets that specify a range of network addresses to be mapped. The mapper maps the network by, for each target, executing the procedure to perform the tasks on the target. The results of the tasks represent the mapping of the network defined by the initial targets.

18 Claims, 18 Drawing Sheets task queue 214

| target | target state | task | task status | arguments |
|---|---|---|---|---|
| T1 | S5 | task 10 | completed | |
| T1 | S6 | task 12 | running | |
| T3 | S4 | task 10 | ready | |
| | | | | | results queue 215

| target | target state | results |
|---|---|---|
| T1 | S5 | ... |
| T3 | S4 | |

*FIG. 3* node table 1501

| seq. no | field 1 | field 2 | separate |
|---|---|---|---|
| 1 | 15.0.0.1 | 10.192.1.1 | |
| 5 | 16.2.3.4 | 10.192.1.2 | |
| | | | | attribute table 1502

| fkey | seq. no | field 3 | field 4 |
|---|---|---|---|
| 1 | 3 | 15.0.0.1 | 10.192.1.1 |
| 5 | 4 | 16.2.3.4 | 10.192.1.2 |
| | | | | attribute table 1503

| fkey | seq. no | field 5 | field 6 |
|---|---|---|---|
| 1 | 6 | foo.com | |
| 1 | 7 | www.foo.com | |
| 5 | 8 | acme.com | |
| | | | |

*FIG. 15* attribute 1 table (key) 1601

| entity ID | attribute ID | field 1 | field 2 |
|---|---|---|---|
| eh1 | ah1 | 15.0.0.1 | 10.192.1.1 |
| eh2 | ah2 | 16.2.3.4 | 10.192.1.2 |
| | | | | attribute 2 table (key) 1602

| entity ID | attribute ID | field 3 |
|---|---|---|
| eh1 | ah3 | foo.com |
| eh1 | ah4 | www.foo.com |
| eh2 | ah5 | acme.com |
| | | |

*FIG. 16*

INTERNET PROTOCOL NETWORK MAPPER

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many organizations have multiple computer networks that include tens of thousands of hosts such as desktop computers, servers, gateways, routers, printers, televisions, cell phones, and so on. These hosts communicate with one another by sending messages that are typically divided into packets of information. A source host sends a packet to a destination host by specifying that the packet is to be delivered to the address of the destination host. Most computer networks are Internet Protocol ("IP") networks that employ an Internet Protocol ("IP") addressing scheme to address hosts such as IP version 4 ("IPv4") or IP version 6 ("IPv6"). IPv4 specifies an IP address of 32 bits that is divided into a network address portion and a host address portion. IPv4 addresses are typically represented by four numbers that vary from 0 to 255 separated by periods such as "10.168.1.1." IPv4 originally allowed the network address portion to be 8, 16, or 24 bits, referred to as class A, B, or C IP addresses, respectively. The combination of IP address and class uniquely identifies a host, which is represented as "10.168.1.1/B" for an IPv4 class B address. Because these three network address sizes meant that many host addresses might go unused, IPv4 was updated to employ the Classless Inter-Domain Routing ("CIDR") in which the network address could vary in size from 1 to 31 bits. The combination of the IP address and the number of bits in the network address, referred to as a network address mask, uniquely identifies a host, which is represented as "10.168.1.1/20" for an IPv4 address with a 20 network address. The 32-bit IP address of IPv4 was thought at one time to be large enough to uniquely identify all hosts of each network. Because of the rapid growth of the Internet and computer networks for both organizations and individuals, a 32-bit IP address proved to be not large enough. IPv6 was developed to overcome the 32-bit limitation of IPv4. IPv6 specifies that an IP address has 128 bits and can thus address over $10^{28}$ more addresses than IPv4.

An organization may modify the configuration of its networks from time to time to meet its changing needs. For example, the organization may add new hosts, upgrade operating systems, install new applications, and so forth on its existing networks and may even create new networks or sub-networks. Although system administrators try to keep accurate records of the configuration of the network, referred to as a "network map," the task of keeping such records is time-consuming and error-prone in part because of the large number of hosts and applications and the large number of modifications made to the network over many years.

Many automated tools have been developed to assist a system administrator in generating and updating a network map, especially for IP networks. To learn the configuration of hosts, some tools send messages to the hosts using Simple Network Management Protocol ("SNMP"). An SNMP-enabled host responds to requests for configuration information. When a host receives from a requesting host an SNMP request message that is addressed to it, the host retrieves the requested configuration information (referred to as a variable) and sends to the requesting host a response message that includes the configuration information. A tool that employs SNMP may be provided an IP address of a target host and sends a series of requests to that target host to obtain the configuration information of that target host. One well-known tool is Nmap, which probes a computer network to extract various types of configuration information. For example, Nmap can scan a range of IP addresses to discover hosts within that range, scan for open ports on a host, and retrieve system configuration information such as identifying the operating system of a host.

Although these automated tools help simplify the task of generating a network map, the task of generating a network map for large networks can be very difficult for several reasons. For example, a network administrator may not even know what ranges of IP addresses are used by a network. Without knowing these ranges, the process of host discovery may be very slow as a very large range of IP addresses may need to be checked. Moreover, the network traffic needed to check so many IP addresses may place an unacceptable burden on the network. As another example, a network administrator may need to run many different tools to get as complete a network map as possible. Because of the complexity of the tools and the computer networks, it can be difficult for a network administrator to keep track of what tools to run, when to run the tools, and in what order to run the tools. It would be desirable to have a tool that would help overcome these difficulties.

BRIEF DESCRIPTION OF THE DRAWINGS

FIG. 3 is a block diagram that illustrates a task queue and results queue in some embodiments.

FIG. 15 is a block diagram that illustrates tables of the network map database in some embodiments.

FIG. 16 illustrates attribute tables that use a hash of attributes as a surrogate key.

DETAILED DESCRIPTION

Figure 1:
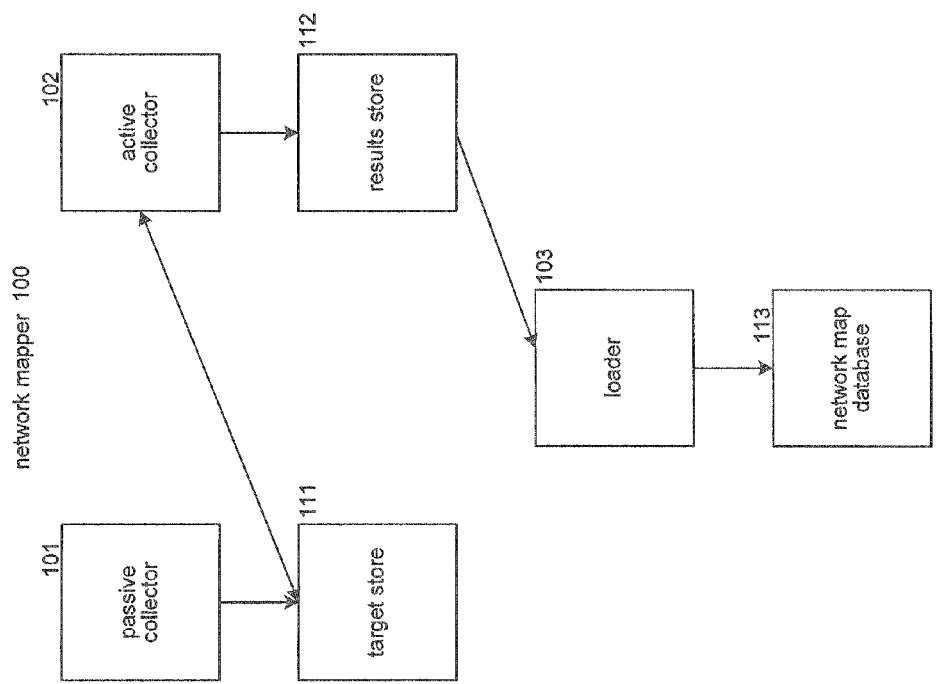
FIG. 1 is a block diagram illustrating components of a network mapper in some embodiments.

A method and system for performing tasks on targets is provided. In some embodiments, the system may be used to implement a network mapper that performs tasks on targets that are hosts of a computer network. The network mapper generates a network map of an IP network that specifies the hosts of the network, the configurations of the hosts (e.g., operating system and applications), and overall environment of the network (e.g., topology of the network) by performing tasks on targets specified as IP addresses. The network mapper inputs a mapping procedure that defines how the network is to be mapped. The mapping procedure may specify what tasks are to be performed, when the tasks are to be performed, and in what order the tasks are to be performed. Each task specifies processing that is to be performed on a target to produce results of the task. For example, one task may specify to scan a range of IP addresses to discover the hosts within the range, and another task may specify to retrieve configuration information from a host. The tasks may be implemented as scripts, executable programs, subprograms, and so on. The mapping procedure may also specify input parameters for a task. The network mapper provides a common task interface so that input parameters to, execution of, and results of a task can be handled in a uniform manner. An existing network mapping tool may be provided a wrapper that provides a layer for translating the common task interface to a tool-specific interface. The network mapper also inputs initial targets, such as a range of IP addresses, that specify a network or sub-network to be mapped. The network mapper maps the network by, for each target, executing the mapping procedure to perform the tasks on the target. The results of the tasks represent the mapping of the network defined by the initial targets. Different mapping procedures can be developed to accommodate the different goals in mapping a network. For example, one mapping procedure may be developed to identify the hosts and the operating systems running on those hosts. Another mapping procedure may be developed to collect detailed configuration data of only certain types of hosts (e.g., web servers). Thus, a network administrator can select an already developed mapping procedure or develop a new mapping procedure to meet the desired goals. In addition, because the network mapper provides a common task interface, a task can be defined that performs any functionality.

Although the system for performing tasks on targets is described primarily in reference to an embodiment that maps an IP network, the system may be used to accomplish goals that are very different from the mapping of an IP network. For example, a goal may be to collect all the available information about an email address—an initial target. A procedure can be developed, for example, to search for web pages that contain the email address and to search contact files that contain the email address. If a contact file contains a name associated with the email address, then the procedure can then search for web pages that contain that name. The procedure can then identify the primary topic of each web page. The results of the procedure may be the names associated with the email address and the topics of the web pages. Such a procedure may employ a task to perform a web search, a task to search the contact files of employees of an organization, and a task to determine the topic of a web page. Each of these tasks is performed on a target and may generate additional targets. The task to perform a web search is performed for targets that are email addresses and names and adds each web page as a new target. The task to search contact files is performed only for targets that are email addresses and adds each name associated with the email address as a new target. The task to determine the topic of a web page is performed on targets that are web pages. Each of these tasks can use conventional tools (e.g., web search engine) with a wrapper that implements the common task interface.

To execute such a procedure to collect the information about an email address, the system starts out with the email address as the initial target and performs the task to search for web pages and the task to search contact files for that initial target, which may be performed in parallel. When a task for a target completes, the system performs the next task for that target (if any) and starts processing any new targets added by that task. Thus, when a web page is added as a new target, the system may perform the task to determine the topic of a web page. When a name is added as a new target, the system performs the task to search for web pages that contain that name, which adds the web pages as new targets. When all tasks are complete and there are no new targets, then the processing of the initial target is complete. The system thus performs the procedure on one or more initial targets, and since the performing of the procedure on a target may result in the adding of new targets, the system transitively performs the procedure on the new targets. Moreover, the tasks specified by a procedure can perform any functionality because the system is agnostic as to the functionality of the tasks.

In some embodiments, the network mapper employs a state transition model to control the performing of tasks. A mapping procedure specifies various states of processing a target. The mapping procedure may specify, for each state, a task to be performed when a target enters that state and a next state to transition to after the task is complete. The mapping procedure may also specify conditions for conditionally performing a task or for selecting a next state. The conditions may be based on type of a target (e.g., a range of IP addresses or a single IP address), results of a completed task, an input parameter, and so on. To start mapping an IP network, the network mapper inputs one or more targets. To process a target, the network mapper identifies an initial state for that target, which may be a default initial state or specified by the mapping procedure based on type of target. When a target enters a state, the network mapper determines whether a task is specified for that state and, if so, launches that task. When that task completes or if no task is specified for that state, the network mapper transitions the target into any next state. If a state has multiple next states, then the network mapper processes that target in each of the next states separately. Thus, the states that a target transitions through may be represented as a tree structure or more generally a graph structure (e.g., a directed acyclic graph) with nodes representing states and links representing transitions from one state to the next state. A state with multiple next states is represented as branches in the tree structure. A leaf node of the tree structure represents an execution path or state path starting at the initial state. When a branch occurs, the tasks of the branches may be performed in parallel. If a state has no next state, then the processing for that target down that state path completes.

The network mapper may include a passive collector, an active collector, and a loader. The passive collector collects ranges of IP addresses used by an organization. The active collector inputs the ranges of IP addresses as targets and performs the tasks of a mapping procedure on those targets to generate results. The loader inputs the results and loads them into a database. The passive collector is considered to be passive because it monitors IP traffic without sending requests for network information to the hosts. The active collector is considered to be active because it sends requests for network information to the hosts. The active collector uses network bandwidth and requires the hosts to use their resources in responding to requests.

The passive collector identifies ranges of IP addresses ("IP ranges") that may be used by an organization. The network mapper may use these IP ranges to define the subset of IP addresses of a network that is to be mapped. The passive collector monitors IP traffic of the organization to identify IP addresses of hosts within the organization. The passive collector may be a program that executes on various devices of the network to identify the IP addresses of network packets. Because not all hosts may be active during the passive collecting or because not all routes through the network may be monitored, the passive collector may not identify the IP addresses of all hosts. To help ensure that the all hosts are mapped by the network mapper, the passive collector generates collections of IP ranges based on the identified IP addresses in an attempt to identify the actual ranges of IP addresses used by an organization. The passive collector logically represents the IP addresses in a CIDR format. To generate the collections of IP ranges, the passive collector identifies unique network addresses assuming a maximum network address mask. For example, if the maximum network address mask is 24 and the IP addresses included IP addresses 10.168.1.2 or 10.168.1.3 or both, then the passive collector identifies 10.168.1 as a unique network address. The passive collector adds each unique network address to the collection as an IP range for that unique network address. For example, the passive collector may represent the IP ranges 10.168.1.0/24. After adding the IP ranges for the unique network addresses, the passive collector identifies groups of IP ranges of the collection that can be represented by a combined IP range with a combined network address mask that is smaller than the smallest network address mask in the group. For example, if the IP ranges include 10.168.0.0/24 and 10.168.1.0/24, then those ranges can be replaced with a combined IP range of 10.168.0.0/23. The passive collector may combine pairs of IP ranges only when the monitored IP addresses include at least one IP address in each of the IP ranges of the maximum network address mask that is covered by the combined pair, referred to as fully covered. So, for example, if the monitored IP addresses included 10.168.0.5, 10.168.1.2, 10.168.2.3, and 10.168.3.7, then their corresponding IP ranges would be combined into 10.168.0.0/22 because of the full coverage to 22 bits. If, however, no IP addresses are identified in the range of 10.168.2.x, then the coverage would not be full and the passive collector would generate ranges 10.168.0.0/23 and 10.168.3.0/24. Alternatively, the passive collector may combine IP ranges without full coverage. For example, if the IP range provides full coverage for a network address mask of 20 except for one IP range with a network address mask of 24, the passive collector may generate a combined IP range for a network address mask of 20.

In some embodiments, the network mapper may employ a loader to load results of the network mapping into a database. To avoid the overhead associated with the database generating sequence numbers for database records, the loader may generate a surrogate key for each entity (e.g., host) from attributes that uniquely identify that entity. For example, a host may be uniquely identified by the combination of a gateway IP address and an internal IP address. To generate the surrogate key, the loader applies a hash function, such as a cryptographic hash function, to the attributes and uses the resultant hash value as the key. When a record is to be added to the database, the loader generates the surrogate key and submits a request to the database to add a record. If the database already contains that record, the loader needs to take no further action. When a record is to be retrieved from the database, the loader again generates the surrogate key and submits a request to the database. If a database sequence number was used as a surrogate key, the loader may have to submit multiple requests to the database, such as for allocating a new sequence number and then for adding the record or submitting a request that would require the database to identify the record using the attributes that uniquely identify the entity. Moreover, if the surrogate key of a table for entities is used as a foreign key in another table, the loader can generate the surrogate key and avoid the overhead of submitting a request to the database for the sequence number corresponding to the attributes of the entity. Thus, the use of a hash of attributes that uniquely identify a record as a surrogate key allows the surrogate key to be generated independently of the database and independently by each database client.

FIG. 1 is a block diagram illustrating components of a network mapper in some embodiments. The network mapper 100 includes various components such as a passive collector 101, an active collector 102, and a loader 103. The network mapper also includes various data stores such as a target store 111, a results store 112, and a network map database 113. The passive collector monitors the IP traffic of an IP network to collect IP addresses of the IP network. After collecting the IP addresses, the passive collector then aggregates the IP addresses into IP ranges that may be allocated to an organization. The passive collector stores these IP ranges as targets in the target store. The active collector inputs the targets of the target store and actively collects network information for the targets. The active collector stores the collected information in the results store. The loader updates the network map database based on information in the results store and the target store.

Figure 2:
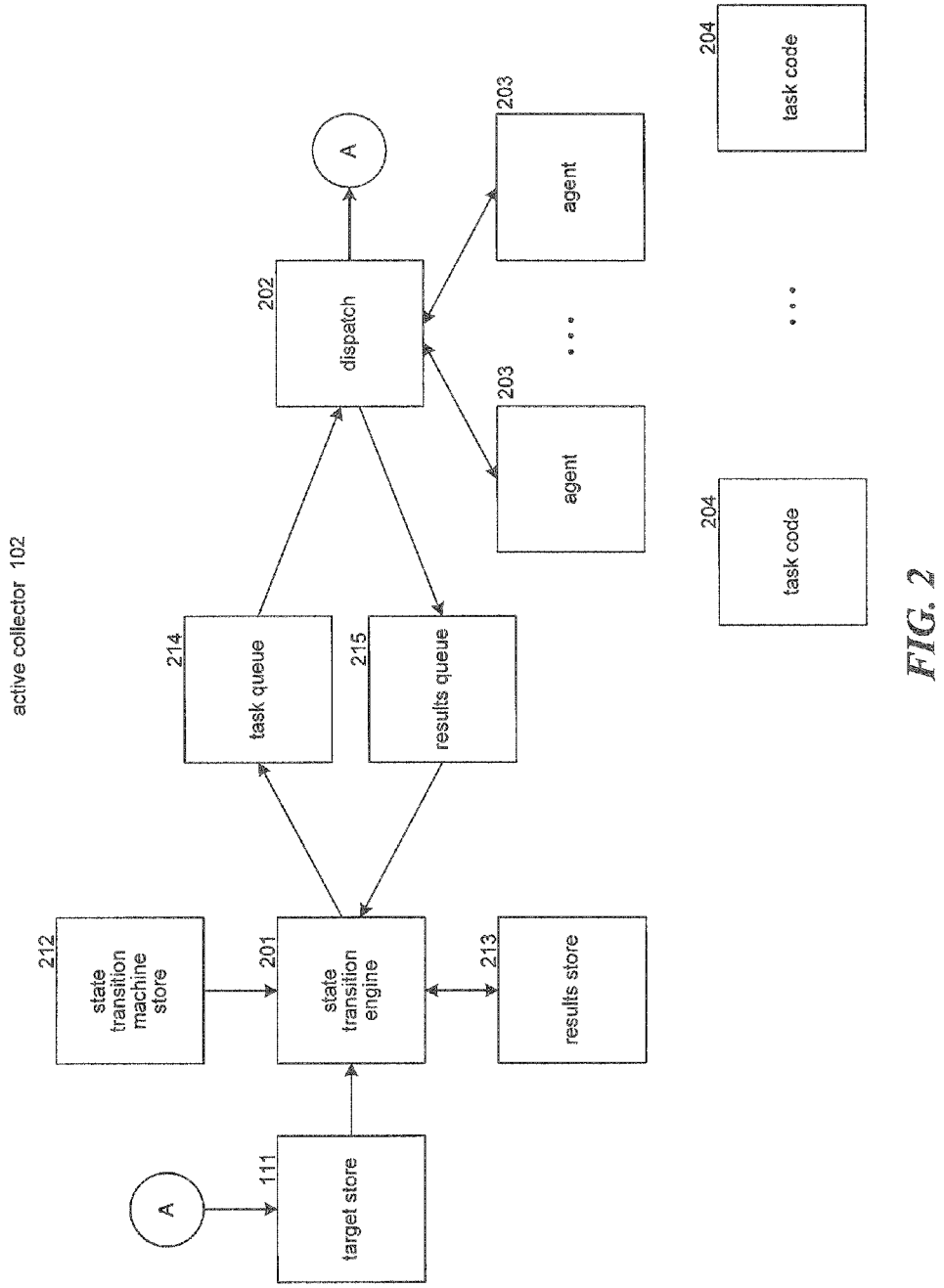
FIG. 2 is a block diagram that illustrates components of the active collector in some embodiments.

FIG. 2 is a block diagram that illustrates components of the active collector in some embodiments. The active collector 102 includes various components such as a state transition engine 201, a dispatcher 202, agents 203, and task code 204. The active collector also includes a state transition machine store 212, a results store 213, a task queue 214, and a results queue 215. The state transition engine inputs targets from the target store 111, processes the targets as defined by the state transition machine (i.e., mapping procedure), and stores the results of the processing in the results store. As the state transition engine processes a target, it adds tasks to the task queue and retrieves results of those tasks from the results queue. The dispatcher awaits requests from running agents. When a request for a task is received, the dispatcher checks the tasks in the task queue, dispatching an appropriate task to the requesting agent. When the agent completes the task, it communicates the results to the dispatcher, which then stores the results in the results queue. Each agent loads task code that implements the task that has been assigned to the agent. The agent then executes the loaded task code. Although not illustrated, each task code may have a wrapper that provides a common interface between the agents and the task code. Also, the task code with their wrappers may be stored in a task code store (not illustrated). The dispatcher and state transition may execute as different processes or different threads within the same process. Each agent may be executed as separate processes or different threads within the process of the dispatcher.

FIG. 3 is a block diagram that illustrates a task queue and results queue in some embodiments. The task queue 214 includes an entry for each task that the state transition engine has requested to have performed. Each entry identifies the target for the task, the current state for that target, the task, the current status of the task, and arguments for the task. The task statuses for a task may include ready, running, and completed. The task status of ready indicates that the task is ready to be dispatched. The task status of running indicates that the task has already been dispatched but has not completed. The task status of completed indicates that the task has completed. For example, the first row of the task queue indicates that the target is T1, the target state is S5, the task is TASK10, and the task status is completed. The results queue 215 includes an entry for each completed task. Each entry identifies the target for the task, the target state for the target, and the results of the task. For example, the first row of the results queue indicates that the target is T1, the target state is S5, and the results are represented by the ellipsis. Although the data stores of the network mapper may be described in terms of a certain data organization technique (e.g., queue and database), the data stores may be implemented using other data organization techniques.

The computer system on which the network mapper executes may include a central processing unit and memory, and may include input devices (e.g., keyboard and pointing devices), output devices (e.g., display devices), and storage devices (e.g., disk drives). Computer-readable media include computer-readable storage media and data transmission media. The computer-readable storage media are tangible media that include memory and other storage devices that may have recorded upon or may be encoded with computer-executable instructions or logic that implement the network mapper. The data transmission media are media for transmitting data using signals or carrier waves (e.g., electromagnetism) via a wire or wireless connection.

The network mapper may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
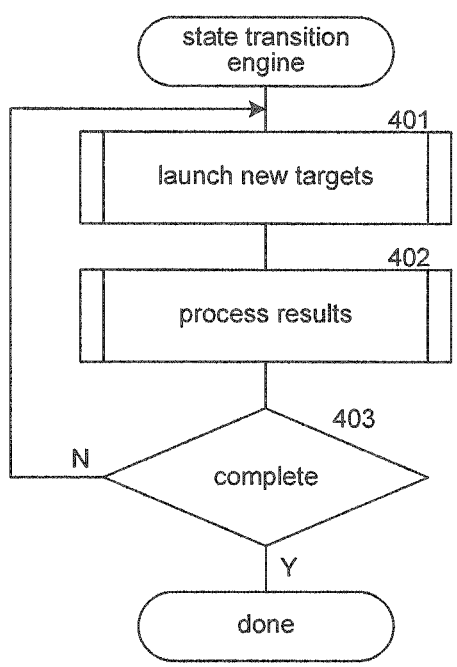
FIG. 4 is a flow diagram that illustrates the processing of the state transition engine of the network mapper in some embodiments.

FIG. 4 is a flow diagram that illustrates the processing of the state transition engine of the network mapper in some embodiments. The state transition engine loops, launching the processing of new targets and processing the results of the tasks. The component may complete when the target store is empty and all the tasks have completed. Although described as a loop, the component may be implemented to respond to events such as the adding of a new target to the target store or adding results to the results queue. In block 401, the state transition engine invokes a launch new targets component to start the processing for the targets in the target store. In block 402, the component invokes the process results component to process the results in the results queue. In decision block 403, if the state transition engine has completed the processing for the targets, then it completes, else the state transition engine loops to block 401 to continue processing.

A state transition machine may be described using an eXtensible Markup Language ("XML") format. Each state may be defined by a "state" element that specifies the name of the state, the task to be performed, and any next state. Each task may be specified by a "task" element that specifies the name of the task and the input parameters (or arguments) for the task. Table 1 lists an example state transition machine. The state transition machine processes targets that are either IP ranges in the CIDR format or IP addresses. For IP ranges, the state transition machine indicates to perform a bulk scan task (e.g., run an Nmap program) to scan the addresses within an IP range. For IP addresses, the state transition machine indicates to perform various SNMP tasks (e.g., run an SNMP program) to collect configuration data for specific hosts. The bulk scan task may add the IP addresses of the hosts that responded as targets for the SNMP tasks.

TABLE 1

```
 1.  <TASKABLE_TARGET_ENTRY_POINTS>
 2.    <TT_DEF TYPE="CIDR" GOTO_STATE="CIDR_start"/>
 3.    <TT_DEF TYPE="IPV4" GOTO_STATE="IPV4_start"/>
 4.  </TASKABLE_TARGET_ENTRY_POINTS>
 5.
 6.  <STATE NAME="CIDR_start">
 7.    <A_NEXT_STATE NAME="bulkScan"/>
 8.  </STATE>
 9.
10.  <STATE NAME="bulkScan">
11.    <TASK NAME="bulkScan" CARDINALITY="1">
12.      <ARG VALUE="--openPortScan=half"/>
13.      <ARG VALUE="--topPorts=100"/>
14.      <ARG VALUE="--portServiceProbe"/>
15.      <ARG VALUE="--osDetect"/>
16.      <ARG VALUE="--nmapScriptScans"/>
17.      <ARG VALUE="--traceRoute"/>
18.    </TASK>
19.  </STATE>
20.
21.  <STATE NAME="IPV4_start">
22.    <A_NEXT_STATE NAME="snmpV3Probe"/>
23.    <A_NEXT_STATE NAME="snmpCommStrCheck"/>
24.  </STATE>
25.
26.  <STATE NAME="snmpV3Probe">
27.    <TASK NAME="snmpV3Probe"/>
28.      <IF XPATH_QUERY="count(//UDP/SERVICE[@NAME='snmp' and @VERSION='3'])>0">
29.        <TRUE>
30.          <A_NEXT_STATE NAME="snmpScanV3"/>
31.        </TRUE>
32.      </IF>
33.    </TASK>
34.  </STATE>
35.
36.  <STATE NAME="snmpScanV3">
37.    <TASK NAME="snmpScan">
38.      <ARG VALUE="--snmpVersion=3"/>
39.      <ARG VALUE="--walkRoutes"/>
40.    </TASK>
41.  </STATE>
42.
43.  <STATE NAME="snmpCommStrCheck">
44.    <TASK NAME="snmpCommStrCheck"/>
45.      <IF XPATH_QUERY="count(//SNMPAUTH/COMMUNITY)>0">
46.        <TRUE>
47.          <A_NEXT_STATE NAME="snmpScanV12" />
48.        </TRUE>
49.      </IF>
50.  </STATE>
51.
52.  <STATE NAME="snmpScanV12">
53.    <TASK NAME="snmpScan">
54.      <ARG VALUE="--snmpVersion"/>
```

TABLE 1-continued

```
55.    <ARG VALUE="//SNMPAUTH/COMMUNITY/
       @VERSION"/>
56.    <ARG VALUE="--communityString"/>
57.    <ARG VALUE="//SNMPAUTH/COMMUNITY/test( )"/>
58.    <ARG VALUE="--walkRoutes"/>
59.    </TASK>
60. </STATE>
```

Lines 1-4 define the initial states for the different types of targets "CIDR" and "IPV4." Lines 6-9 define a state that specifies no task but has a next state. Lines 10-19 define a state for performing a bulk scan task. The state specifies the arguments for the task, which are passed to the task code. Line 11 specifies that the CARDINALITY is 1, which means that only one bulk scan should be in progress at a time. By limiting the number of bulk scans, the overhead on the network resulting from the network mapping can be controlled. The dispatcher may enforce the limit by leaving bulk scan tasks on the task queue if another bulk scan task is currently being executed by an agent. Lines 21-24 define a state with no tasks and two next states. The state transition engine may process the first next state until its state path end or a state alone the state path specifies a task and then process the second next state. Alternatively, the state transition engine may process the next states in parallel. Lines 26-34 define a state with a task and a conditional next state. The "if" element specifies that if the SNMP version is 3, then the target goes to the next state. The "XPATH_QUERY" variable indicates that the results store is to be accessed to determine whether the target supports SNMP version 3. In some embodiments, the results store may be implemented as an XML document with an element for each target storing the results for that target in accordance with an XML Schema Definition ("XSD"). The state transition engine updates the XML document from the results queue and accesses the XML document to guide its processing or retrieve input parameters for tasks. Lines 36-41 define a state that specifies a task but has no next state. Lines 43-50 define a state with a task and a conditional next state. Lines 52-60 define a state with a task but no next state. Lines 55 and 57 specify that the values for the parameters (e.g., SNMP version number) are to be retrieved from the results store.

Figure 5:
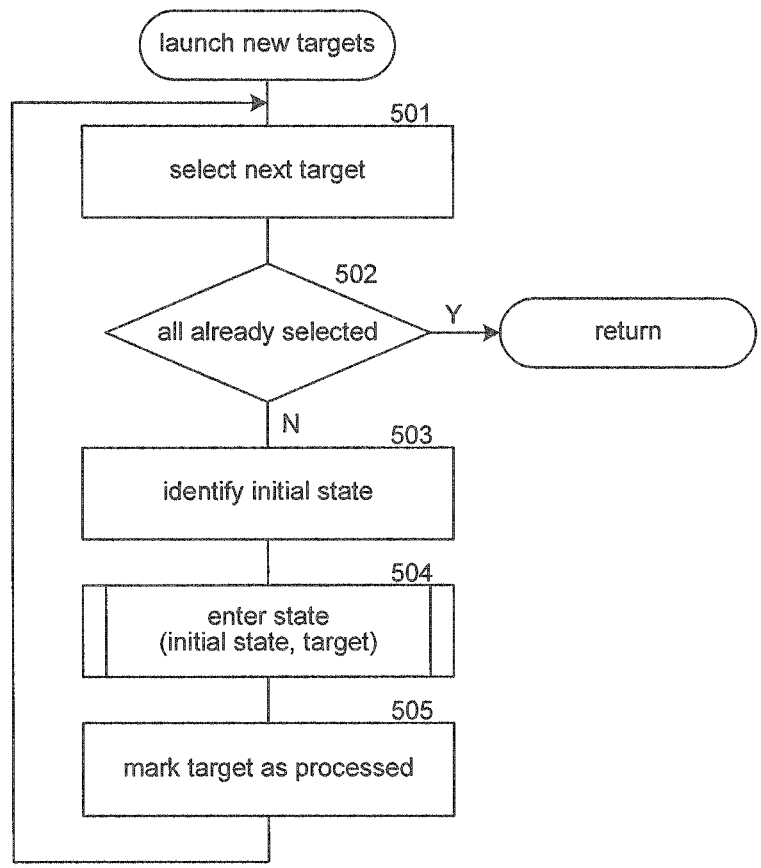
FIG. 5 is a flow diagram that illustrates the processing of the launch new targets component of the network mapper in some embodiments.

FIG. 5 is a flow diagram that illustrates the processing of the launch new targets component of the network mapper in some embodiments. The component launches the processing for targets of the target store. In block 501, the component selects the next target. In decision block 502, if all the targets have already been selected, then the component returns, else the component continues at block 503. In block 503, the component identifies the initial state for the target from the transition state machine store. In block 504, the component invokes the enter state component passing an indication of the initial state and the target. In block 505, the component marks the target as processed and then loops to block 501 to select the next target.

Figure 6:
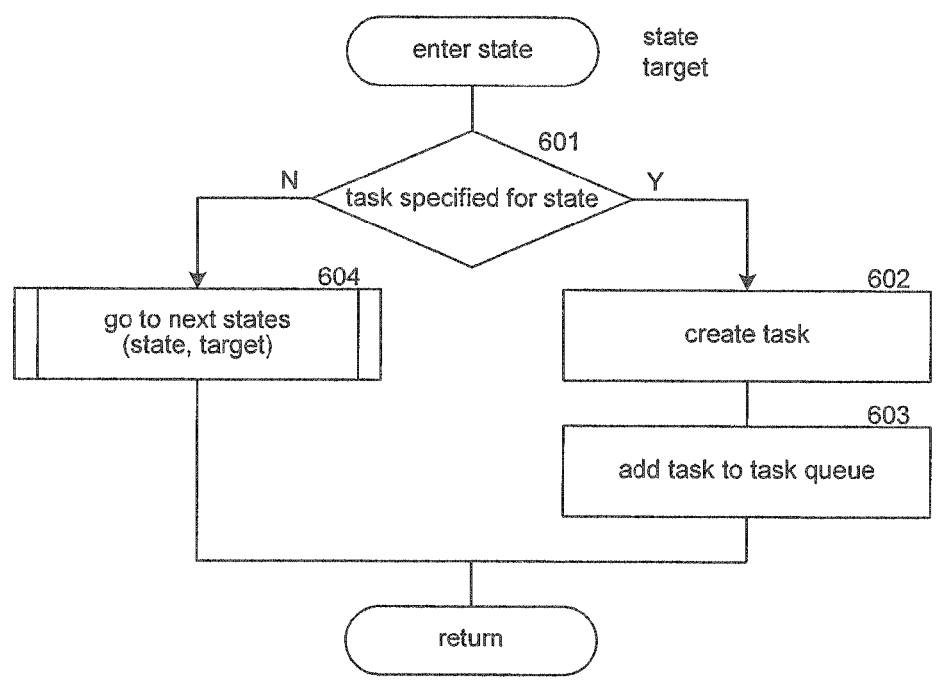
FIG. 6 is a flow diagram that illustrates the processing of an enter state component of the network mapper system in some embodiments.

FIG. 6 is a flow diagram that illustrates the processing of an enter state component of the network mapper system in some embodiments. The component is passed an indication of the state to enter and the target and initiates the processing of that state. In decision block 601, if a task is specified for the state, then the component continues at block 602, else the component continues at block 604. In block 602, the component creates a task for the target as specified by the state transition machine. The component creates a task by collecting the input parameters and generating a record to be added to the task queue. In block 603, the component adds the task to the task queue and then returns. In block 604, the component invokes the go to next states component passing an indication of the passed state and then returns.

Figure 7:
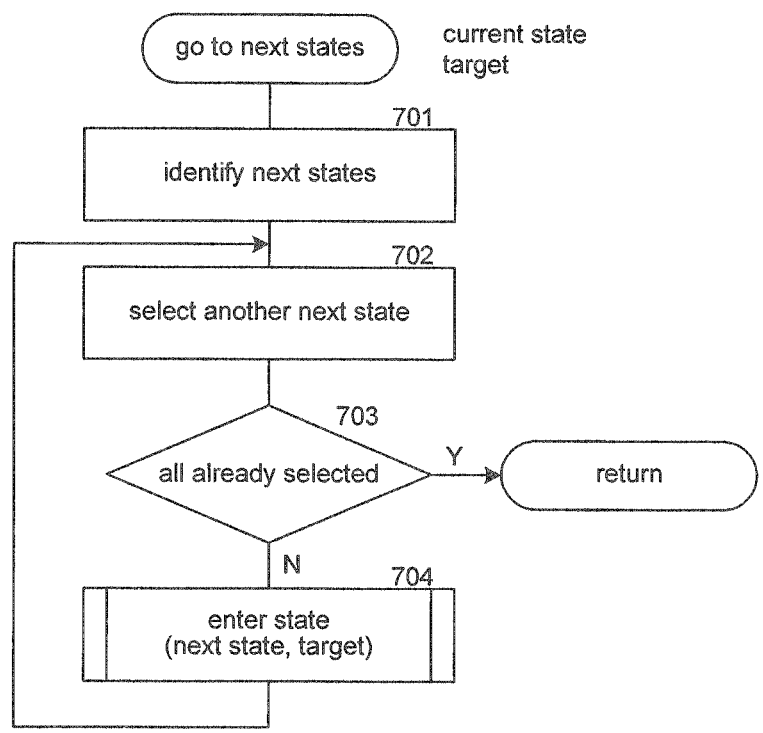
FIG. 7 is a flow diagram that illustrates the processing of the go to next states component of the network mapper in some embodiments.

FIG. 7 is a flow diagram that illustrates the processing of the go to next states component of the network mapper in some embodiments. The component is passed an indication of a current state and a target and enters each of the next states for that target. In block 701, the component identifies the next states of the current state. The current state may have zero or more next states. In block 702, the component selects another of the next states. In decision block 703, if all the next states have been selected, then the component returns, else the component continues at block 704. In block 704, the component invokes the enter state component passing an indication of the selected next state and the target. The component then loops to block 702 to select another next state.

Figure 8:
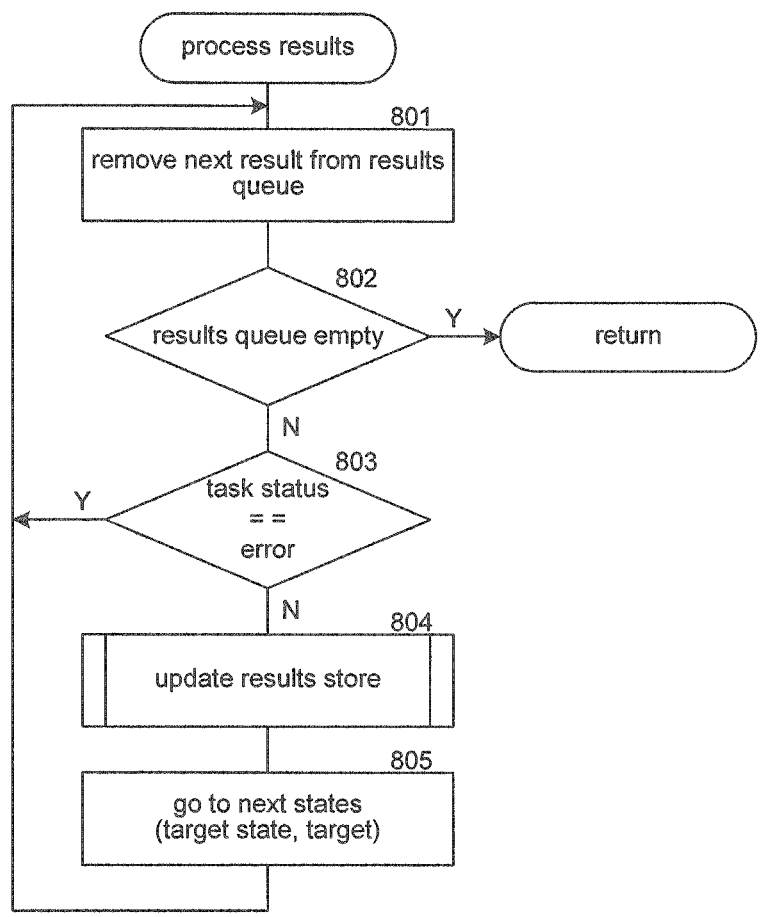
FIG. 8 is a flow diagram that illustrates the processing of the process results component of the network mapper in some embodiments.

FIG. 8 is a flow diagram that illustrates the processing of the process results component of the network mapper in some embodiments. The component processes each of the results in the results queue. In block 801, the component removes the next results from the results queue. In decision block 802, if the results queue was already empty, then the component returns, else the component continues at block 803. In decision block 803, if the task status indicates an error, then the component loops to block 801 to remove the next result, else the component continues at block 804. In block 804, the component updates the results store. In block 805, the component invokes the go to next states component passing an indication of the target state and the target. The component then loops to block 801 to remove the results in the results queue.

Figure 9:
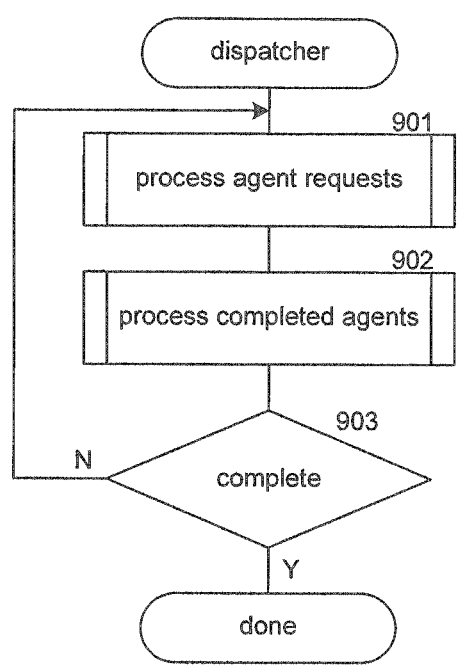
FIG. 9 is a flow diagram that illustrates the processing of the dispatcher of the network mapper in some embodiments.

FIG. 9 is a flow diagram that illustrates the processing of the dispatcher of the network mapper in some embodiments. The dispatcher awaits requests from running agents. When a request for a task is received, the dispatcher checks the tasks in the task queue, dispatching an appropriate task to the requesting agent. When the agent completes the task, it communicates the results to the dispatcher, which then stores the results in the results queue. In block 901, the component invokes a process agent requests component to dispatch tasks in the tasks queue as appropriate to dispatch tasks to the requesting agents. The dispatcher may implement various types of throttling to limit the overhead on the network. For example, the dispatcher may limit the number of certain types of tasks (e.g., bulk scans) that can execute at the same time or may limit certain types of task to running only at certain times (e.g., late at night). The throttling may be specified by data in the state transition machine or a separate configuration file. In block 902, the component invokes a process completed agents component to store the results of successfully completed tasks in the test results queue. In decision block 903, if the dispatcher has completed its processing, then the component completes, else the component loops to block 901 to continue processing. Like the state transition engine, the dispatcher may be event driven.

Figure 10:
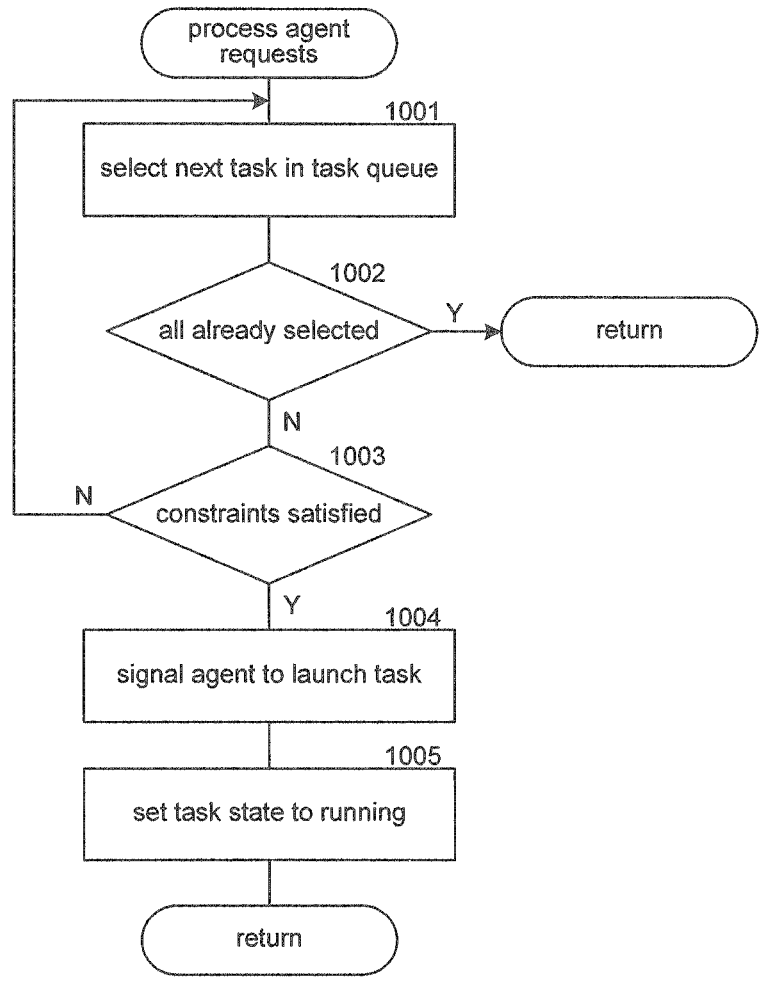
FIG. 10 is a flow diagram that that illustrates the processing of the process agent request component of the network mapper in some embodiments.

FIG. 10 is a flow diagram that that illustrates the processing of the process agent requests component of the network mapper in some embodiments. The component selects the next ready task of the task queue with its throttling constraints satisfied and dispatches the task to the requesting agent. In block 1001, the component selects the next task in the task queue that is ready. In decision block 1002, if all the ready tasks have already been selected meaning that no task is ready to be dispatched, then the component returns, else the component continues at block 1003. In decision block 1003, if the throttling constraints for the selected task have been satisfied, then the component continues at block 1004, else the component continues loops to block 1001 to select the next task. In block 1004, the component signals the agent to launch the selected task. In block 1006, the component sets the task state of the selected task to running and returns.

Figure 11:
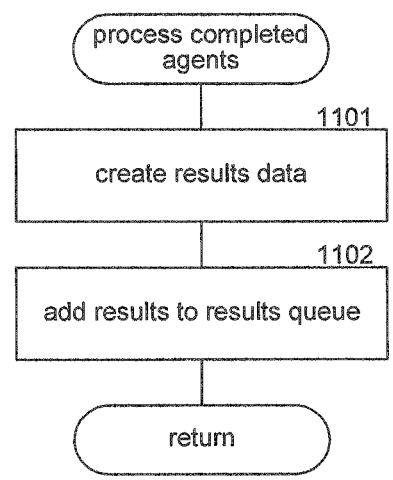
FIG. 11 is a flow diagram that illustrates the processing of a process completed agents component of the network mapper in some embodiments.

FIG. 11 is a flow diagram that illustrates the processing of a process completed agents component of the network mapper in some embodiments. The process completed agents component completes the processing of tasks that an agent has completed by adding the results of the task to the results queue. In block 1101, the component creates results data for the completed task. In block 1102, the component adds the results data to the results queue and then returns.

Figure 12:
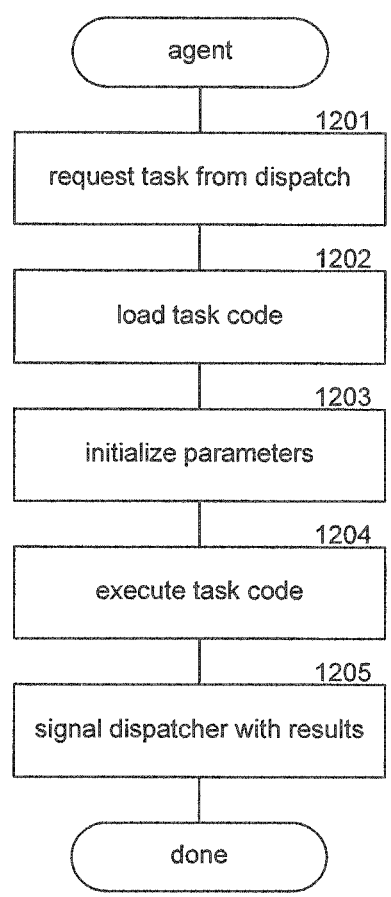
FIG. 12 is a flow diagram that illustrates the processing of an agent of the network mapper in some embodiments.

FIG. 12 is a flow diagram that illustrates the processing of an agent of the network mapper in some embodiments. In block 1201, the component loads the task code, which may have a wrapper that provides the common task interface between the agent and the task code. In block 1202, the component initializes the parameters for the task code. In block 1203, the component executes the task code. In block 1204, the agent signals the dispatcher that the agent is completed and may store the results directly in the results queue. The component then completes.

Figure 13:
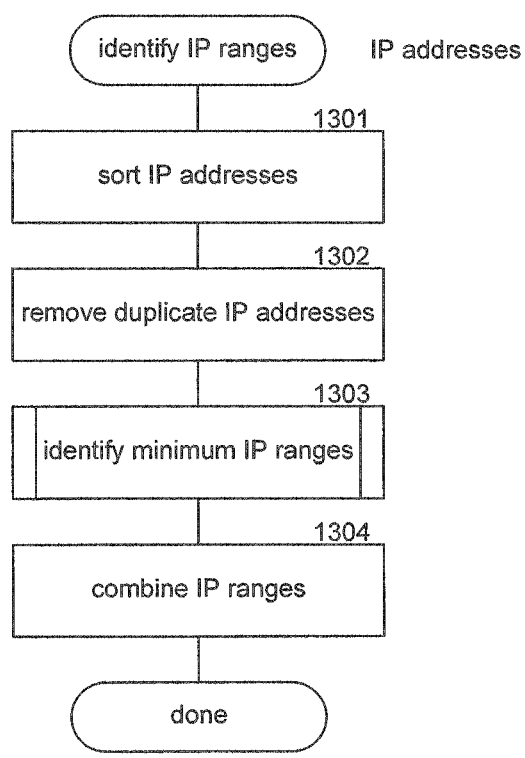
FIG. 13 is a flow diagram that illustrates the processing of the identify IP ranges component of the passive collector of the network mapper in some embodiments.

FIG. 13 is a flow diagram that illustrates the processing of the identify IP ranges component of the passive collector of the network mapper in some embodiments. The component is passed IP addresses that have been passively collected by monitoring IP addresses and generates IP ranges for those IP addresses. In block 1301, the component sorts the IP addresses in numerical order. In block 1302, the component removes any duplicate IP addresses. In block 1303, the component invokes an identify minimum IP ranges component. In block 1304, the component combines the IP ranges and then completes. The component may combine the IP ranges by invoking the merge function of the netaddr Python library published by the Python Software Foundation.

Figure 14:
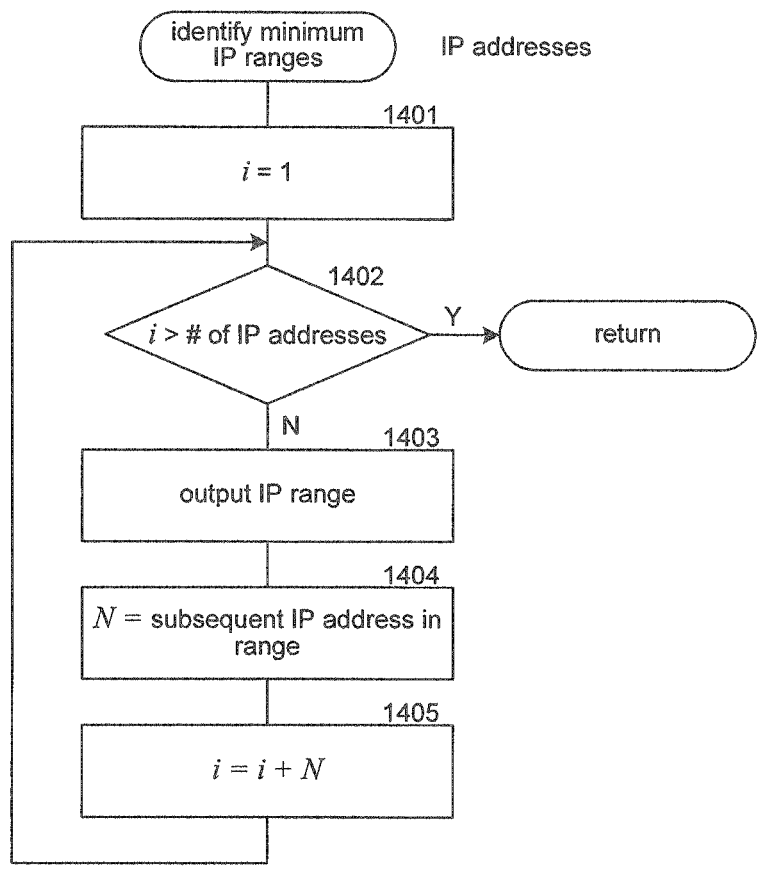
FIG. 14 is a flow diagram that illustrates the processing of an identify minimum IP ranges component of the passive collector of the network mapper in some embodiments.

FIG. 14 is a flow diagram that illustrates the processing of an identify minimum IP ranges component of the passive collector of the network mapper in some embodiments. The component is passed a sorted list of unique IP addresses and identifies initial IP ranges. In block 1401, the component initializes an index for indexing through the IP addresses. In decision block 1402, if all the IP addresses have already been processed, then the component returns, else the component continues at block 1403. In block 1403, the component outputs an IP range for the indexed IP address in a CIDR format. In block 1404, the component identifies the subsequent IP addresses that are in that IP range. In block 1405, the component adds the number of subsequent IP addresses to the index to skip over those IP addresses when processing and then loops to block 1402.

FIG. 15 is a block diagram that illustrates tables of the network map database in some embodiments. The network mapper may represent the hosts as nodes, and the results for the hosts as links between the nodes. The nodes and links are different types of entities. The database may have a node table 1501 and attribute tables 1502 and 1503. The node table contains fields for identifying each host of the network. The fields that identify a host may be a gateway IP address and an internal IP address. The attributes tables store various attributes for each host. Each attribute table has a collection of related fields. In order to tie the attributes to the nodes of the node table, the loader may request the database to generate a unique sequence number for each node in the node table. The loader uses that sequence number as a surrogate key for the node table. The attribute tables use the sequence number of a node as a foreign key to tie a row in an attribute table to a row in the node table. In addition, the loader may request a sequence number to be generated for each row of an attribute table. As described above, a difficulty with using sequence numbers generated by the database is that whenever the loader seeks to add a new node or to update the attributes of a node, the loader needs to first access the node table to determine whether the node is already in the node table and, if so, retrieve the sequence number from the node table. Since the process of checking the node table for tens of thousands and hundreds of thousands of nodes may put a high overhead on a database system, the network mapper may generate surrogate keys from a hash of attributes that uniquely identify a host or other entity represented in the database.

FIG. 16 illustrates attribute tables that use a hash of attributes as a surrogate key. Tables 1601 and 1602 include entity identifiers and attribute identifiers that are generated as hashes of the primary key (e.g., one or more fields that uniquely identify the entity) and serve as surrogate keys. Because the fields of the primary key for an entity are stored in an attribute table, referred to as a key attribute table for that entity, a separate table to store the surrogate keys for an entity is not needed. To determine whether an entity already exists, the loader generates the hash of the primary key and then attempts to add the entity to the key attribute table for that entity. If the entity is already in the key attribute table, then the loader can update the other attribute tables. If the entity is not in the key attribute table, the loader can add the entity and can continue to update the other attribute tables using the hash. The loader would not have to then submit a request to the key attribute table to retrieve the surrogate key for the newly added entity.

Figure 17:
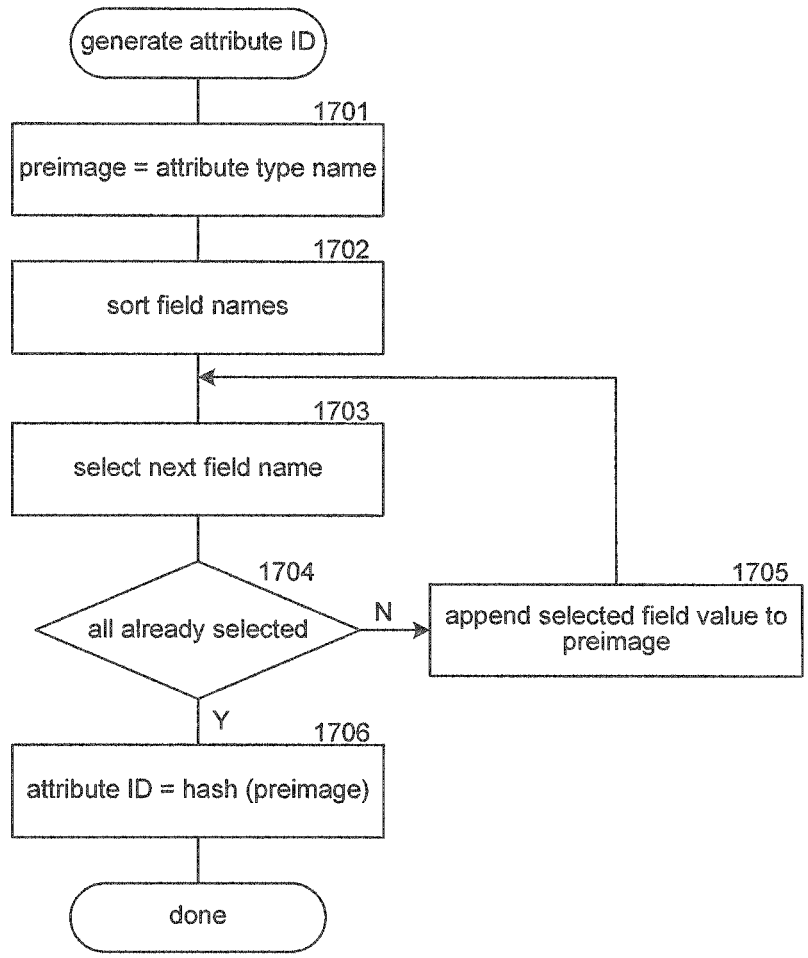
FIG. 17 is a flow diagram that illustrates processing of a generate attribute identifier component of the loader in some embodiments.

FIG. 17 is a flow diagram that illustrates processing of a generate attribute identifier component of the loader in some embodiments. In block 1701, the component initializes a preimage for the hash function to the type name of the attribute. In block 1702, the component sorts the field names in a standard order such as alphabetical order. In block 1703, the component selects the next field name. In decision block 1704, if all the field names have already been selected, then the component continues at block 1706, else the component continues at block 1705. In block 1705, the component appends a delimiter and the value for the selected field name to the preimage and then loops to block 1703 to select the next field name. In block 1706, the component sets the attribute identifier to the hash of the preimage and then completes.

Figure 18:
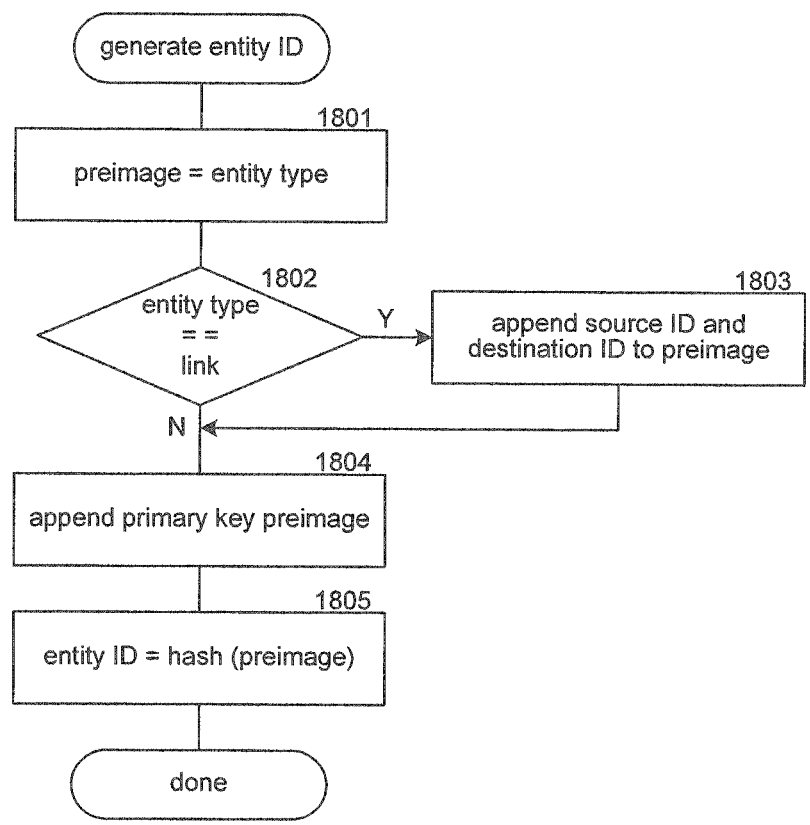
FIG. 18 is a flow diagram that illustrates the processing of the generate entity identifier component of the loader in some embodiments.

FIG. 18 is a flow diagram that illustrates the processing of the generate entity identifier component of the loader in some embodiments. The component generates an entity identifier as a hash of the primary key of an entity. In block 1801, the component initializes a preimage to the entity type (e.g., node or link). In decision block 1802, if the entity type is a link, then the component continues at block 1803, else the component continues at block 1804. In block 1803, the component appends to the preimage a delimiter followed by the entity identifier for the source of the link followed by a delimiter and the entity identifier of the destination. In block 1804, the component appends to the preimage a delimiter and the primary key of the entity. In block 1805, the component sets the entity identifier to a hash of the preimage and then completes.

We claim:

1. A computing system for performing tasks on targets, the computing system comprising:
   a memory storing computer-executable instructions of:
      a component that accesses a state transition machine defining states of a procedure, at least some of the states specifying a task and a next state; and
      a state transition engine that, for each target, sets a current state for the target to an initial state; and
repeatedly performs the processing of the current state as defined by the state transition machine until a termination condition is satisfied by:
when the current state specifies a task, directing the task to be performed for the target by invoking task code for the task for the target; and
when the current state does not specify a task or upon completion of the task when the current state specifies a task, setting the current state for the target to a next state of the current state
wherein the targets are IP ranges of an IP network and the tasks are for actively collecting information from hosts of the IP network to map the IP network; and
a processor that executes the computer-executable instructions stored in the memory.

2. The computing system of claim 1 including:
a dispatcher that, in response to being directed by the state transition engine that a particular task be performed for a particular target, notifies an agent to perform the particular task for the particular target and, upon being notified that the particular task for the particular target is complete, notifies the state transition engine that the particular task for the particular target is complete; and
an agent that, in response to being directed to perform the particular task, loads the task code for the particular task and executes the loaded task code to perform the particular task for the particular target and, upon completing the particular task, notifies the dispatcher that the particular task for the particular target is complete.

3. The computing system of claim 2 wherein multiple agents execute in parallel, each agent performing a task on a target.

4. The computing system of claim 3 wherein the task code for each task is wrapped in a common task interface and wherein an agent interacts with the task code through the common task interface.

5. The computing system of claim 1 wherein when a state has multiple next states, any tasks of the next states are performed in parallel.

6. The computing system of claim 1 wherein a task identifies an additional target to be processed by the state transition engine.

7. The computing system of claim 1 wherein a task generates information for an entity associated with a target and including a component that generates a hash from the generated information that uniquely identifies the entity, the hash being used to uniquely identify a record in a database that stores information for the entity.

8. The computing system of claim 1 including a component that passively collects IP addresses by monitoring the IP network and generates IP ranges from the IP addresses.

9. The computing system of claim 1 wherein a task generates a target that is an IP address of a host to be processed by the state transition engine.

10. A non-transitory computer-readable storage medium containing computer-executable instructions for controlling a computing device to map a network, the instructions comprising:
a component that accesses a state transition machine defining states, at least some of the states specifying a task and a next state;
a component that accesses initial targets, each target specifying a network address; and
a state transition engine that, for each target,
sets a current state for the target to an initial state; and
repeatedly performs the processing of the current state as defined by the state transition machine by:
when the current state specifies a task, directing the task to be performed for the target by invoking task code for the task for the target; and
when the current state does not specify a task or upon completion of the task when the current state specifies a task, setting the current state for the target to a next state of the current state
wherein the network is an IP network, the targets are IP ranges of the IP network, and the tasks are for collecting information from hosts of the IP network to map the IP network.

11. The computer-readable storage medium of claim 10 including a component that passively collects IP addresses by monitoring the IP network and generates IP ranges from the IP addresses.

12. The computer-readable storage medium of claim 11 wherein a task generates a target that is an IP address of a host to be processed by the state transition engine.

13. A method performed by a computing device to map an IP network, the method comprising:
providing initial targets, each target specifying an IP range of one or more IP addresses;
providing a state transition machine defining states of a procedure, at least some of the states specifying a task and a next state, each specified task for collecting information from hosts of the IP network wherein at least one task identifies an additional target that is an IP address of a host; and
for each target,
setting a current state for the target to an initial state; and
repeatedly performing processing of the current state as defined by the state transition machine until a termination condition is satisfied by:
when the current state specifies a task, directing the task to be performed for the target by invoking task code for the task for the target wherein a target identified by a task is processed in accordance with the state transition machine; and
when the current state does not specify a task or upon completion of the task when the current state specifies a task, setting the current state for the target to a next state of the current state.

14. The method of claim 13 further comprising:
when a particular task is to be performed for a particular target, directing an agent to perform the particular task for the particular target and receiving from the agent a notification that the particular task for the particular target is complete; and
in response to an agent being directed to perform the particular task, loading by the agent the task code for the particular task and executing the loaded task code to perform the particular task for the particular target and upon completing the particular task, sending by the agent a notification that the particular task for the particular target is complete.

15. The method of claim 14 wherein multiple agents execute in parallel, each agent performing a task on a target.

16. The method of claim 15 wherein the task code for each task is wrapped in a common task interface and wherein an agent interacts with the task code through the common task interface.

17. The method of claim 13 wherein when a state has multiple next states, any tasks of the next states are performed in parallel.

18. The method of claim 13 wherein a task generates information for an entity associated with a target and further comprising generating a hash from the generated information that uniquely identifies the entity, the hash being used to uniquely identify a record in a database that stores information for the entity.

\* \* \* \* \*